J. B. LACKIE.
CLOTHES PIN.
APPLICATION FILED AUG. 15, 1911.
1,075,112.
Patented Oct. 7, 1913.
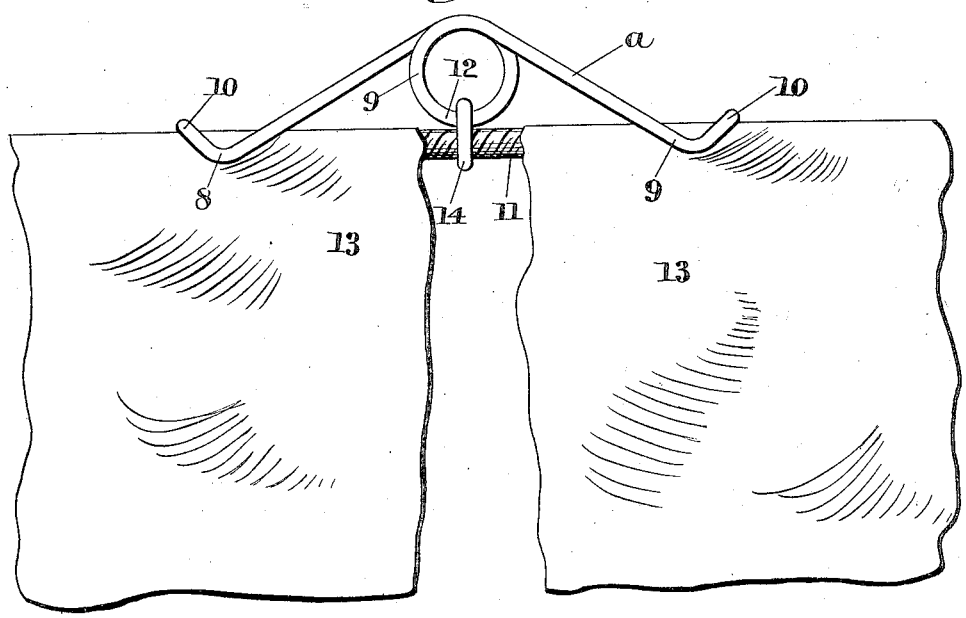
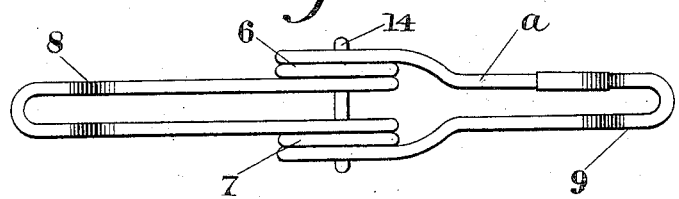
Witnesses
Alfred G. Seiler
Inventor
J. B. Lackie
By Victor J. Evans
Attorney

UNITED STATES PATENT OFFICE.

JOHN B. LACKIE, OF WINNIPEG, MANITOBA, CANADA.

CLOTHES-PIN.

1,075,112.	Specification of Letters Patent.	Patented Oct. 7, 1913.

Application filed August 15, 1911. Serial No. 644,094.

*To all whom it may concern:*

Be it known that I, JOHN B. LACKIE, a subject of the Kingdom of Great Britain, residing at Winnipeg, in the Province of Manitoba and Dominion of Canada, have invented new and useful Improvements in Clothes-Pins, of which the following is a specification.

The general objects of the invention are to increase the number of gripping surfaces of clothes pins; to adapt these devices for permanent connection to a clothes line; and to further adapt the devices for ready attachment to the clothes line for easy attachment to the clothes and detachment therefrom.

Other objects will appear and be better understood from the following description taken in connection with the accompanying drawings, in which, Figure 1 is a side elevation of the device applied to a clothes line and holding the clothes thereon. Fig. 2 is a detail plan of the device.

The clothes pin $a$ is preferably formed of a single length of wire known as spring wire. The wire is coiled at different portions thereof so as to provide the central coils 6 and 7.

8 and 9 indicate the gripping jaws which extend in opposite directions from the coils 6 and 7 and diverge from the coils.

By preference the terminals of the coils are at the highest points on the same when the device is upright on the line as shown in Fig. 1 and when so viewed, the jaws 8 and 9 are inclined downwardly adjacent to their outer ends when they are offset upwardly as at 10. The width of the space between the offset portions is normally less than the diameter of the line 11 so that the jaws will spread apart and grip the line therebetween when the device is adjusted so that the line will underlie the space and the pin forced downwardly until the connected ends 12 abut the line. As viewed in Fig. 1 the offset portions are a trifle below the horizontal planes of the coils 6 and 7 so that the lower portions of these coils are disposed to opposite sides and in a plane with the line when the device is positioned therein, as more plainly shown in Fig. 1.

By providing the central coils 6 and 7 the spring action of the jaws is materially stiffened so as to enable these elements to coöperate with the line clamp the piece of clothes 13 therebetween. Since the gripping surfaces of the jaws 8 and 9 are round and smooth there will be little or no danger of the jaws cutting or otherwise damaging the most delicate fabric.

The device is by preference connected to the line 12 by means of a wire loop 14 which embraces the line and passes through the coils 6 and 7. This loop is of sufficient size to permit of the adjustment of the device into the position shown in Fig. 1 and serves to prevent disengagement of the pin and at the same time permits the latter to be readily moved to any desired portion of the line.

Although I have shown and described one embodiment of my invention it is to be understood that I am not to be limited to the specific structure or arrangement of parts since various changes may be made, within the scope of the appended claim without departing from the spirit or sacrificing any of the advantages of the invention.

What I claim as new is:

A device of the kind described comprising a resilient wire member, said member consisting of two diverging U-shaped arms, a coil formed laterally of the terminals of one of said U-shaped arms, the legs of both of said arms being substantially in alinement, a coil integral and in alinement with said first-named coil formed laterally of the latter upon the terminals of said second-named arm, offset portions angularly formed upon the outermost ends of said U-shaped arms, the innermost surface of said alining coils being in line with the inner edges of the loop portions of said angular offsets, and a link loosely engaging said coils.

In testimony whereof I affix my signature in presence of two witnesses.

JOHN B. LACKIE.

Witnesses:
 WALTER MOSCRIP,
 WILSON HARDING.